US006328086B1

(12) United States Patent
Takahashi et al.

(10) Patent No.: US 6,328,086 B1
(45) Date of Patent: Dec. 11, 2001

(54) LABELING MACHINE

(75) Inventors: Shoji Takahashi, Kawaguchi; Junichi Sato, Ohmiya, both of (JP)

(73) Assignee: Shinsei Industries Co., Ltd., Tokyo (JP)

( * ) Notice: Subject to any disclaimer, the term of this patent is extended or adjusted under 35 U.S.C. 154(b) by 0 days.

(21) Appl. No.: 09/486,907

(22) PCT Filed: Jan. 20, 1999

(86) PCT No.: PCT/JP99/00173

§ 371 Date: Mar. 3, 2000

§ 102(e) Date: Mar. 3, 2000

(87) PCT Pub. No.: WO99/42372

PCT Pub. Date: Aug. 26, 1999

(30) Foreign Application Priority Data

Feb. 20, 1998 (JP) .......... 10-080131
Sep. 10, 1998 (JP) .......... 10-296000

(51) Int. Cl.[7] .......... B32B 31/00
(52) U.S. Cl. .......... 156/363; 156/362; 156/542; 156/579
(58) Field of Search .......... 156/362, 363, 156/540, 541, 542, 574, 577, 579

(56) References Cited

U.S. PATENT DOCUMENTS

| | | | | |
|---|---|---|---|---|
| 5,254,206 | * | 10/1993 | Wing | 156/542 |
| 5,516,398 | * | 5/1996 | Goto | 156/540 |
| 5,525,184 | * | 6/1996 | Luff et al. | 156/361 |
| 5,779,852 | * | 7/1998 | Haney et al. | 156/577 |

FOREIGN PATENT DOCUMENTS

| | | |
|---|---|---|
| 1-13052 | 4/1989 | (JP) . |
| 3-212336 | 9/1991 | (JP) . |
| 6-99963 | 4/1994 | (JP) . |
| 8-32532 | 3/1996 | (JP) . |

* cited by examiner

*Primary Examiner*—James Sells
(74) *Attorney, Agent, or Firm*—Fish & Richardson P.C.

(57) ABSTRACT

A label continuum (R) in which a number of printed labels (L) are temporarily stacked on a mounting sheet (S) is made to travel from a label holder (31), and the mounting sheet (S), after being turned by a turn pin (32), is wound while pulled by a motor (21). In keeping with this, each of the labels (L) is peeled off and its non-adhesive face is brought to the sticking section of a rotator. By a mounting sheet slack detecting circuit (50), the motor (21) is driven when the mounting sheet is slack, while by a label detecting circuit (60), the motor (21) is driven until a label is completely stuck and a next label is peeled off and is brought to the sticking section.

3 Claims, 6 Drawing Sheets

LABELING MACHINE

This is a continuation of copending PCT application Ser. No. PCT/JP99/00173, filed Jan. 20, 1999.

TECHNICAL FIELD

This invention relates to a label dispenser in which each of printed adhesive labels in a roll-shaped label continuum can be stuck on an article to be stuck by moving either the label or the article, or by peeling the label manually.

BACKGROUND ART

A conventional label dispenser for sticking printed adhesive labels on articles to be stuck, set forth, for example, in Japanese Patent Preliminary Publication No. Hei 6-99963, like a printing labeler, needs a manual holding operation with a grip and a main lever to peel each of adhesive labels from a mounting sheet so that the label is on standby for its adhesion to an article. Furthermore, this label dispenser is such that a peeled part of the label is pressed against the article by a label sticking section, and the label is pulled (moved) forward in such a way as to rub the surface of the article by the label sticking section and thereby is stuck on the article. In particular, a continuous sticking operation of the label dispenser forms the cause of an operator's fatigue. Still further, because of the structural restriction of the label dispenser, there is a limit to the amount (length) of the label which is required to peel and transfer the label from the mounting sheet by the holding operation. Hence, the label dispenser cannot accommodate labels, each having some degree of length.

It is, therefore, an object of the present invention to provide a label dispenser in which, when an adhesive label is stuck on an article to be stuck in such a way that a mounting sheet of a roll-shaped label continuum on which a number of printed adhesive labels are temporarily stuck in succession is pulled by a winding section with a motor as its drive source (namely, when the label is completely removed from the mounting sheet) before the tip of the next label is automatically peeled from the mounting sheet so that the label is placed on standby for its adhesion to an article and a peeled part of the label is pressed against the article by a label sticking section so that the label is stuck on the article by moving either the label or the article, or when the label is manually pulled out and stuck on the article, the mounting sheet can be pulled automatically even though the mounting sheet is separated from a turn section in accordance with the transfer of the label (namely, even though the mounting sheet is slack) until the label is completely removed from the mounting sheet (that is, while the label is temporarily stuck on the mounting sheet).

DISCLOSURE OF THE INVENTION

The label dispenser of the present invention is designed so that a mounting sheet of a roll-shaped label continuum on which a number of printed adhesive labels are temporarily stuck in succession, is pulled by a winding section with a motor as its drive source on the downstream side of the travel of the mounting sheet passing a turn section. The label dispenser includes a label detecting means for ascertaining whether a label peeled from the mounting sheet is present; a mounting sheet slack detecting means for detecting the slack of the mounting sheet traveling in accordance with the transfer of the label until the label is completely removed from the mounting sheet when a peeled part of the label is pressed against an article to be stuck by the label sticking section and either the label or the article is moved to stick the label on the article or when the label is pulled out manually; a control circuit for driving the motor to pull the mounting sheet by the winding section when the mounting sheet slack detecting means generates a mounting sheet slack detecting output and even when the label detecting means generates a label absence detecting output and a timer circuit which, when the label detecting means is turned to a state of a label presence detecting output, causes the drive of the motor to be continued for a predetermined time, which time is adjustable.

BEST MODE FOR CARRYING OUT THE INVENTION

In accordance with the drawings, one embodiment of the label dispenser according to the present invention will be described in detail below.

Figure 1:
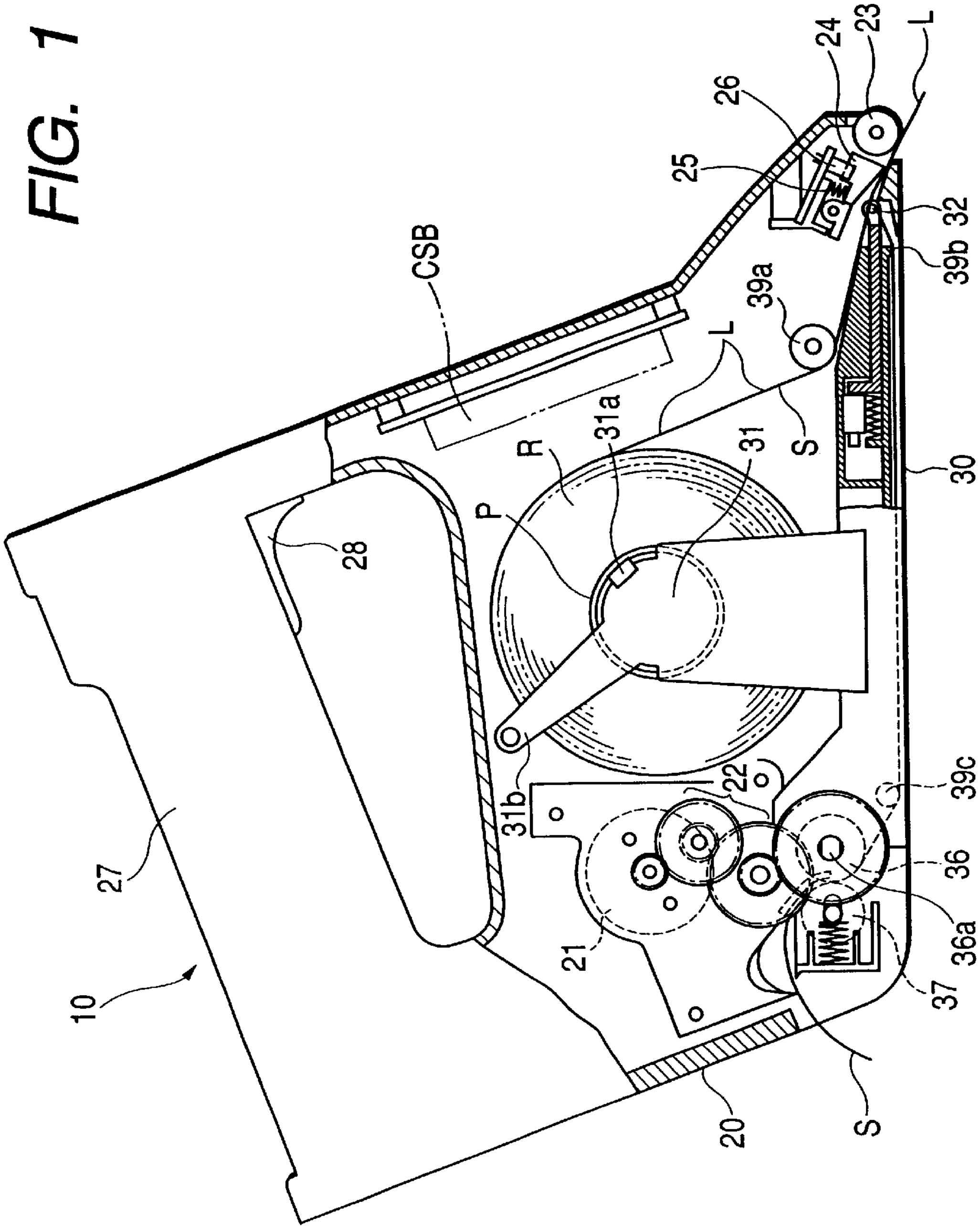
FIG. 1 is a side view showing a label dispenser according to the present invention where a side wall on the front side thereof is removed.
Figure 2A:
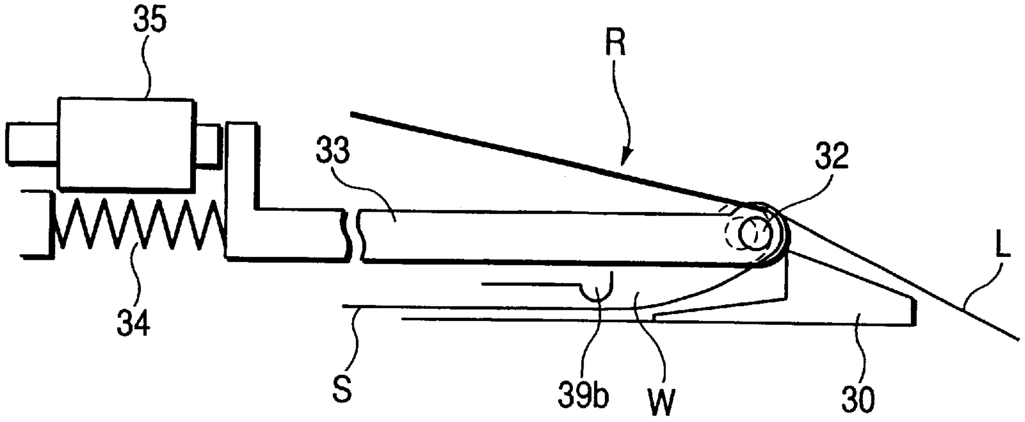
FIGS. 2A and 2B are enlarged views for explaining a turn section in FIG. 1.
Figure 2B:
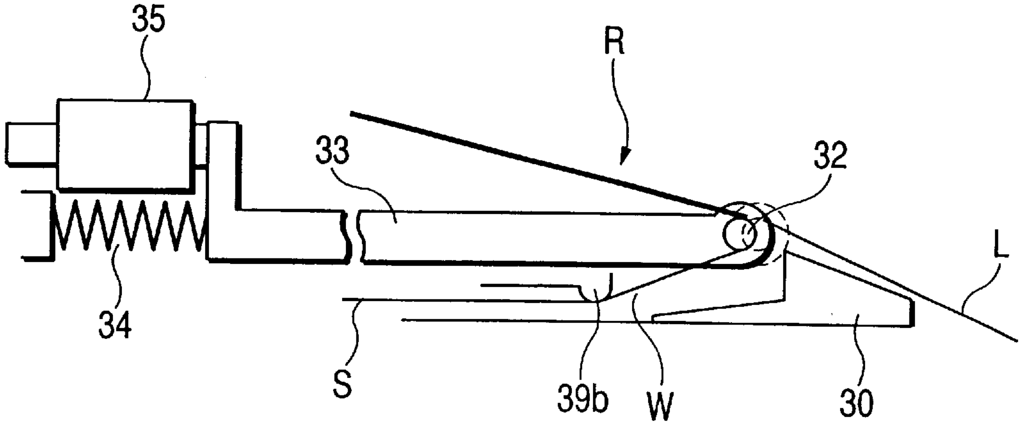

In FIG. 1 and FIGS. 2A and 2B, a label continuum R is such that a number of printed adhesive labels L are temporarily stuck in succession on a mounting sheet S, which is wounded into a roll. A label dispenser 10 is constructed with a body 20 and a bottom cover 30 which is capable of opening and closing, with the shaft of a winding roller to be described later as a supporting point, in regard to the body 20.

A label holder 31 used as a label loading section to set the label continuum R is cantilevered with respect to the bottom cover 30 so that the opposite side of the label holder 31 in FIG. 1 is open, and a part of the holder 31 is provided with a resilience section 31*a* which causes a friction to a board tube P of the label continuum R.

A turn pin 32 for changing the traveling direction of the mounting sheet S in the label continuum R is constructed so that its both ends are rotatably mounted to a pin supporting member 33, which is placed to be displaceable in a lateral direction (the traveling direction of the label or the mounting sheet) with respect to the bottom cover 30 in FIG. 1 and FIGS. 2A and 2B.

Figure 3:
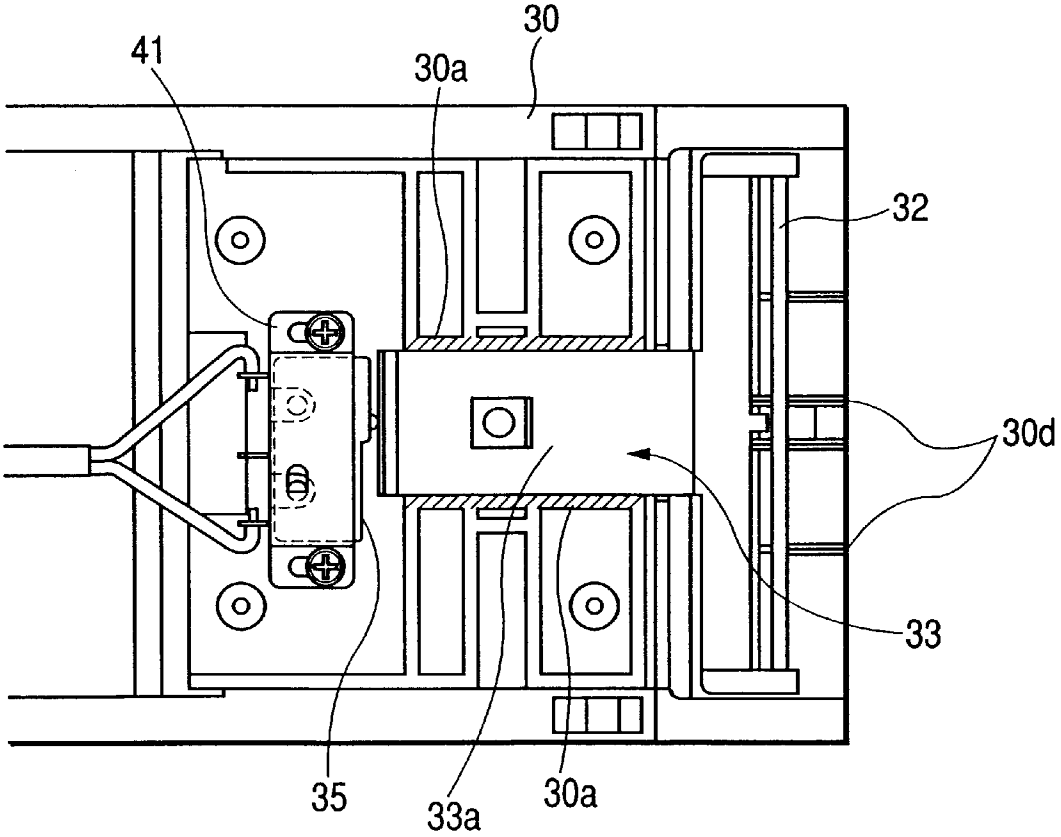
FIG. 3 is an enlarged plan view showing a top portion of a bottom cover of the label dispenser where a part of a cover plate is removed.
Figure 4:
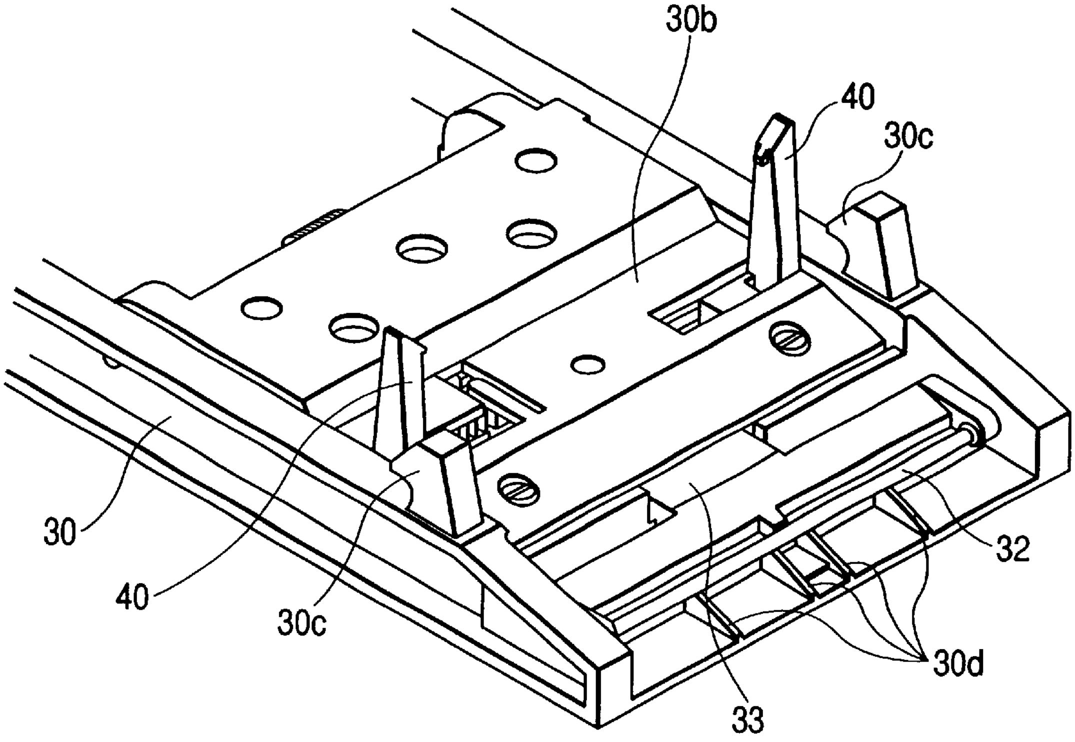
FIG. 4 is an enlarged perspective view showing the top portion of the bottom cover where the cover plate is mounted in FIG. 3.

A specific, displaceable structure of the pin supporting member 33, as shown in FIG. 3, is such that a longitudinal bar section 33*a* of the supporting member 33 having the shape of the letter T in which the turn pin 32 is attached to the top portion thereof is loosely engaged with ribs 30*a* which are configured on the bottom cover 30 and partially indicated by hatching in the figure. In FIG. 4, the engaging portion of the bar section 33*a* is blocked by a cover plate 30*b*.

The pin supporting member 33, as shown in FIG. 2A, is biased toward the right of the figure by a compression spring 34, and when the mounting sheet S is slack, the member 33 is displaced toward the right and the operation of a microswitch 35 adjacent to the left-hand end thereof is released to change an on/off state of the switch.

The microswitch 35 is specifically shown in FIG. 3. Since a member to be operated (a pin plunger), provided in opposition to the end of the longitudinal bar section 33*a* in the pin supporting member 33, structurally has a bias force such that it tends to protrude from the switch body toward the exterior thereof, the compression spring 34 such as that shown in FIGS. 2A and 2B need not necessarily be used.

A winding roller 36 is pivotally mounted to a shaft 36*a* through which the bottom cover 30 is held to the body 20 so that it can be opened and closed. The winding roller 36 is connected through a reduction gear mechanism 22 to a DC motor 21 placed on the side of the body 20, and is pushed by a press roller 37.

The bottom cover 30, as shown in FIG. 4, is provided with top-side label width guides 40 which are associated with each other and moved toward or away from each other by a combination of a rack and a pinion, and is formed with a pair of hooks 30*c* which are engaged with, or disengaged from, a cross bar to be described later, provided on the side of the body 20.

The guide roller 39*a* is placed on the side of the body 20, and a guide projection 39*b* and a guide roller 39*c* are provided on the side of the bottom cover 30 and serve as guides for the travel of the label continuum R and the mounting sheet S. The guide projection 39*b* is the lower edge of a slit W which is provided across the bottom cover 30 to guide the mounting sheet S traveling from the turn pin 32 toward the guide roller 39*c*.

A label sticking roller 23 is rotatably mounted at the top of the body 20, and when the bottom cover 30 is closed, the roller 23 is located on the downstream side of the transfer of the label from the turn pin 32, beyond a temporary label receiver 30*d* provided inside the cover 30 at the top, and receives the printed face (the non-adhesive face) of the label which has been removed and transferred. The temporary label receiver 30*d* of the bottom cover 30 is constructed with several pieces of ribs configured along the traveling direction of the label.

A label sensing plate 24 is mounted to be rotatable at the top of the body 20 so that it can be introduced from the printed face side of the label into the traveling path where the label is peeled off between the turn pin 32 and the label sticking roller 23 when the bottom cover 30 is closed, that is, in the region of the temporary label receiver 30*d*. Furthermore, the label sensing plate 24 is designed to have a bias force for rotation in the direction in which it is introduced, due to a compression spring 25, although soft, and to enter or leave the optical path of a transmission sensor 26 on the opposite side of the traveling path.

A grip 27 is configured by laterally cutting out a part on the upper side of the body 20 and is provided with a trigger switch (a power switch) 28 on the lower side thereof. Moreover, a battery is incorporated in the grip 27.

Figure 5:
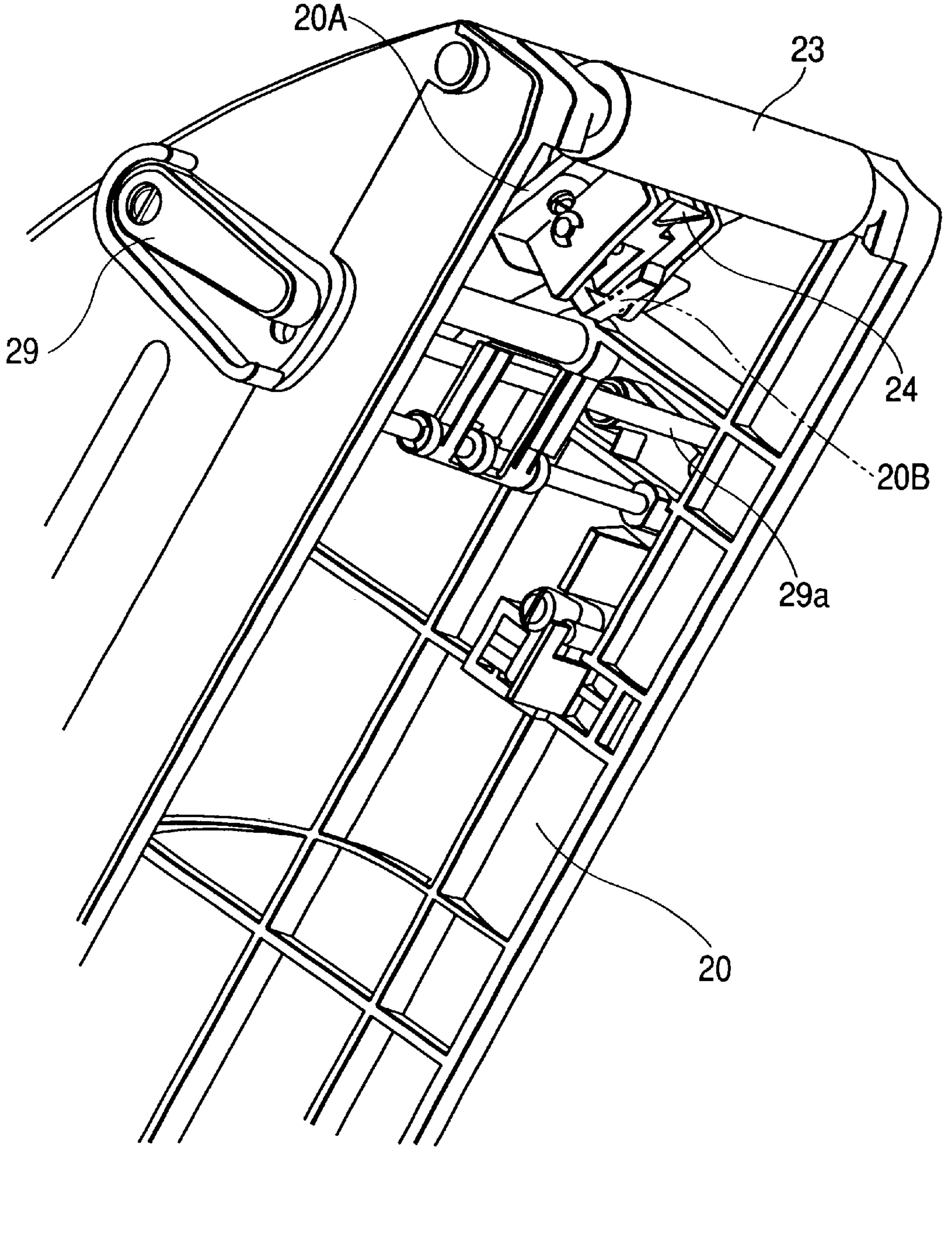
FIG. 5 is an enlarged perspective view showing an a label sticking roller and a label detecting plate of the label dispenser, looking obliquely from below.

Opening and closing levers 29, as shown in FIG. 5, are provided in a pair on both sides of the body 20 at the top (only one side is shown in the figure). The levers 29 are connected to each other, with their upper ends as a supporting point for swing, and the lower ends on the swing side are connected by a cross bar 29*a*, which is engaged with, or disengaged from, the hooks 30*c* of the bottom cover 30.

A control circuit block CSB is shown schematically in a case where it is attached to the body 20, and includes a circuit substrate and circuit elements mounted thereon.

In the label dispenser 10, the bottom cover 30 is first opened by about 90°, with the shaft 36*a* of the winding roller 36 as its supporting point, to set the label continuum R to the label holder 31. In this case, the label continuum R is situated at the middle of the shaft of the label holder 31 by holder-side label width guides 31*b* thereof. Since the board tube P of the label continuum R undergoes a friction by the resilience section 31*a* of the label holder 31, a resistance force acts against the travel of the label continuum R.

Subsequently, a distance between the top-side label width guides 40 is adjusted to the width of the label L (the mounting sheet S), and the top sheet of the label continuum R, after being passed through a space between the width guides 40, is put on the right-hand periphery of the turn pin 32 to change its traveling direction, and is passed through the slit W with the lower edge as the guide projection 39*b*. After the bottom cover 30 is closed, the top of the mounting sheet S from which an unwanted label L is removed is inserted between the winding roller 36 and the press roller 37 through the guide roller 39*c*. Also, when the bottom cover 30 is closed, a portion of the label continuum R on the upstream side, looking from the turn pin 32, is pushed toward the bottom cover 30 by the guide roller 39*a*, and thus the turning effect of the mounting sheet S is improved.

If the top sheet of the label continuum R is merely put on the right-hand periphery of the turn pin 32 to change the direction, the mounting sheet S, as shown in FIG. 2A, will be separated from the guide projection 39*b* and the label continuum R will be slack. Hence, the pin supporting member 33 is pushed by the compression spring 34 and is displaced toward the right, and the pressure of the microswitch 35 is released to detect the slack of the mounting sheet.

Figure 6:
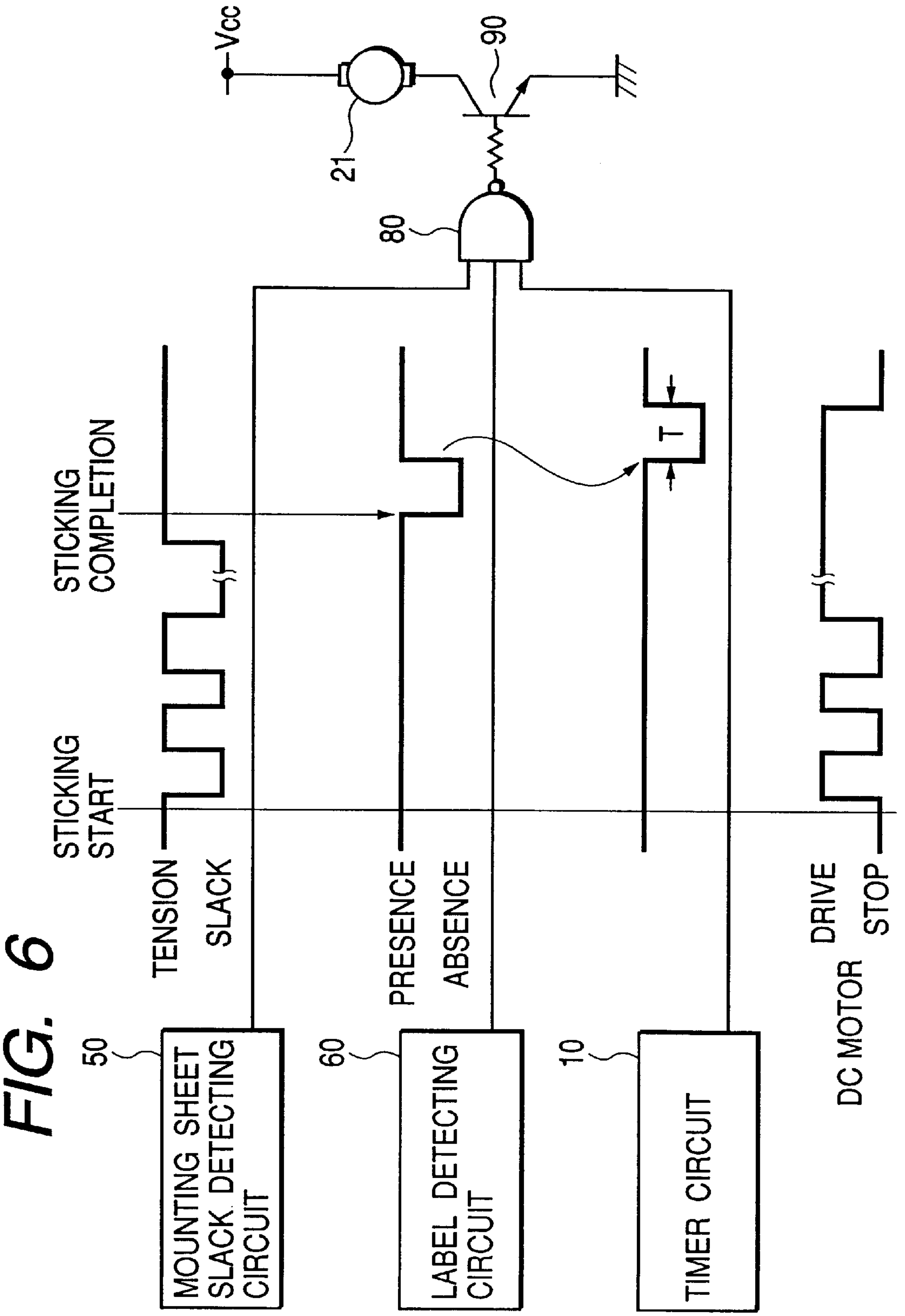
FIG. 6 is an explanatory view showing schematically a control circuit of the label dispenser.

Thus, in the control circuit shown in FIG. 6, when the grip 27 of the body 20 is held and the trigger switch 28 is turned to ON, a mounting sheet slack detecting circuit 50 outputs a mounting sheet slack signal (L level). As a result, an NAD gate circuit 80 opens a gate and causes a transistor 90 to conduct, thereby driving a DC motor 21.

In this way, the winding roller 36 is rotated in a clockwise direction through the reduction gear mechanism 22, and upon rotation of this roller, the press roller 37 is rotated in a counterclockwise direction. Hence, the top of the mounting sheet S is sandwiched between both rollers and the mounting sheet S is pulled.

Since the label continuum R is subjected to a frictional resistance by the resilience section 31*a* of the label holder 31 with respect to the board tube P, it is tightened gradually as the mounting sheet S is pulled. Consequently, each label L on the mounting sheet S turned by the turn pin 32 is peeled off by its own stiffness (in the case where the label is present). As shown in FIG. 2B, when the mounting sheet S is pressed against the guide projection 39*b* and becomes taut, the pin supporting member 33 is displaced toward the left against the tension of the compression spring 34 (but only the bias force of the pin plunger in the microswitch 35 may be exerted) to push the microswitch 35.

By pushing the microswitch 35, the mounting sheet slack detecting circuit 50 changes its output to a mounting sheet tension signal (H level). As a result, the gate of the NAD gate circuit 80 is closed to shut off the transistor 90, causing the DC motor 21 to stop.

In this way, the label L opposite to the mounting sheet turned by the turn pin 32 is peeled by a predetermined length and travels through the temporary label receiver 30*d* so that the printed face is directed toward the label sticking roller 23 and the adhesive face of the back side is exposed.

Where the label L whose adhesive face is exposed is stuck on an article (to be stuck), the grip 27 of the body 20 is held, with the trigger switch 28 turned to ON, and the label L is pressed against the article through the label sticking roller 23. When the whole of the label dispenser 10 is pulled in a direction reverse to that of the transfer of the label L (that is, in the direction of the left), the label is stuck on the article.

When the adhesive face of the label L is pressed against the article and the whole of the label dispenser 10 is pulled in the direction reverse to that of the transfer of the label L, the label L is gradually stuck on the article in such a way that it is transferred from the label dispenser 10. Until the label L is completely removed from the mounting sheet S (namely, while it is temporarily stuck on the mounting sheet S), the mounting sheet S, as shown in FIG. 2A, is slack so as to separate from the turn pin 32 in accordance with the transfer of the label L. When the state of FIG. 2A is brought about, the DC motor 21 is driven as in the case of the initial setting mentioned above, and the mounting sheet S which is slack is pulled by the winding roller 36 and the press roller 37. In this way, the mounting sheet S is returned to the state of FIG. 2B, and the DC motor 21 stops. If the mounting sheet S remains slack in accordance with the transfer of the label L, it will be inserted between the article and the label L, and thus the label L cannot be properly stuck.

As mentioned above, the DC motor 21 repeats the operation that when the mounting sheet S is slack, the DC motor 21 is actuated to pull the mounting sheet S, while when the mounting sheet S becomes taut, the motor 21 stops so that the mounting sheet S ceases to be pulled. The pull of the mounting sheet S serves to facilitate the operation that the label L must be peeled from the mounting sheet S when it is stuck on the article.

When the label L is completely removed from the mounting sheet S and is stuck on the article, thereby separating from the label dispenser 10, the label sensing plate 24 coming in sliding contact with the printed face of the label L which is being peeled is turned in a clockwise direction at a predetermined angle by the tension of the compression spring 25 and is removed from the optical path of the transmission sensor 26. Hence, a label detecting circuit 60 which indicates the state of the transmission sensor 26 as a signal changes its output to a state where the label is absent (L level) and leaves the transistor 90 conducting without closing the gate of the NAD gate circuit 80, causing the drive of the DC motor 21 to continue.

By the pull of the mounting sheet S, under tension, coming in close contact with the turn pin 32, caused by the drive of the DC motor 21*a* according to the signal from the label detecting circuit 60, the next label L is peeled off by its own stiffness and travels straight through the temporary label receiver 30*d* toward the label sticking roller 23. By the label L which is removed and transferred, the label sensing plate 24 is turned in a counterclockwise direction in such a way that it is pushed upward against the tension of the soft compression spring 25, and enters the optical path of the transmission sensor 26. In this way, the label detecting circuit 60 changes its output to the state where the label is present (H level) and triggers a timer circuit 70. The timer circuit 70 having been triggered changes its output to that of a preset time T (L level) and leaves the transistor 90 conducting without closing the gate of the NAD gate circuit 80 during the time T, causing the drive of the DC motor 21 to continue and the peeling of the labels L to proceed.

When the time T of the timer circuit 70 is over, all the signals from the three circuits 50, 60, and 70 become H levels to close the gate of the NAD gate circuit 80. Consequently, the transistor 90 is shut off and the DC motor 21 stops, thus interrupting the peeling operation of the labels.

The label sensing plate 24 is located on the upstream side of the transfer of the label with respect to the label sticking roller 23. The function of the timer circuit 70 is to bring the peeled tip of the next label L to the lower side of the label sticking roller 23 so that the label is on standby for its adhesion. In order to change the amount of peeling of the label L, the timer circuit 70 is designed so that the preset time T can be adjusted, for example, by a variable resistor.

If the label sticking roller is divided into two so that the label sensing plate is extended to its intermediate portion in which the label sticking roller is absent and whether the label is present can be detected in the vicinity of the label sticking roller, the timer circuit 70 need not necessarily be used.

The adhesion of the label to the article is performed by the relative movement between the label dispenser 10 and the article. The adhesion can thus be done even when the label dispenser 10 remains inverted, upside down, and the article is pressed against the label whose adhesive face is exposed, from above the label dispenser 10, so as to rub against the label sticking roller. The label L can also be stuck on the article in such a way that the label dispenser 10 is fixed, with the side of the DC motor 21 as its bottom, and the label L is pulled out manually. In order to use the label dispenser 10 with it fixed, it is convenient to provide, for example, a slide switch such that an on state can be semifixed electrically in parallel with the trigger switch 28.

Subsequently, reference is made to a special case. Since the turn pin 32 mounted to the pin supporting member 33 is displaceable in the traveling direction of the label (namely, in the lateral direction of the figure), it is moved close to or far away from the temporary label receiver 30*d* and a wide space may be provided between the turn pin 32 and the label receiver 30*d*. On the other hand, if the stiffness of the label used is low or the adhesion of an adhesive is high, the label cannot be completely removed from the mounting sheet even when the mounting sheet is turned. Moreover, if this condition is combined with the condition of the wide space between the turn pin 32 and the label receiver 30*d*, the label will not mount on the label receiver 30*d* and will be turned together with the mounting sheet by the turn pin 32, with the result that the label is not peeled off.

In the case where it is specified to use the labels with such properties, the turn pin 32 is moved to the right and the pin supporting member 33 is fixed so that the space between the turn pin 32 and the temporary label receiver 30*d* becomes the narrowest. If the turn pin 32 remains situated in the downstream direction of the transfer of the label, the output of the mounting sheet slack detecting circuit 50 will be fixed in a state where the DC motor 21 continues to operate. Hence, it is necessary to void the circuit 50 or fix the output of the circuit 50 in the same state as the case where the tension of the mounting sheet is detected.

The microswitch 35, as shown in FIG. 3, is fastened to the bottom cover 30 by a switch holding plate 41. Thus, if the fastening of the switch holding plate 41 to the microswitch 35 is relieved and the microswitch 35 is fixed when the pin supporting member 33 is pushed to a right-side displacement limit position by the microswitch 35 (the pin plunger), the space between the turn pin 32 and the temporary label receiver 30*d* becomes the narrowest. Furthermore, that the microswitch 35 pushes the pin supporting member 33 also means that it is pushed by the member 33, and thus the output of the mounting sheet slack detecting circuit 50 is fixed in the same state as the case where the tension of the mounting sheet is detected.

As shown in FIG. 5, a mounting plate 20A for the label sensing plate 24, the compression spring 25, and the transmission sensor 26 is used to provide a leaf spring 20B indicated by two-dot chain lines. By the leaf spring 20B, the degree of turn of the mounting sheet S is improved in such a way that when the bottom cover 30 is closed, the label continuum R is pressed against the inside of the bottom cover 30 at a position close to the turn pin 32.

Consequently, the control circuit is such that, apart from whether the timer circuit 70 is operated, only when the label detecting circuit 60 detects the absence of the label, the DC motor 21 is driven. Even the label which is not completely peeled from the mounting sheet travels, mounting on the temporary label receiver 30*d* without turning along the turn pin 32, and reaches the lower side of the label sticking roller 23. When the circuit 60 detects the presence of the label, the drive of the motor is interrupted.

In this special case, since the mounting sheet slack detecting circuit 50 is not substantially operated, the DC motor is not driven in a state where the label detecting circuit 60 detects the presence of the label (that is, while the label is peeled from the mounting sheet), and the removal of the label is not promoted by the circuit 50. Therefore, if the label is not very long, it will be peeled immediately from the mounting sheet and thus the sticking operation can be performed without any problem.

The use of a fastening mechanism of the pin supporting member 33 by the microswitch 35 accommodates the special case without changing the control circuit.

Industrial Applicability

As mentioned above, the label dispenser according to the present invention, which is capable of easily sticking a predetermined number of labels in succession on articles and is lightweight and sturdy, is very useful for practical use.

What is claimed is:

1. A label dispenser comprising:

a label loading section for holding a roll-shaped label continuum in which a number of printed labels are temporarily stuck in succession on a mounting sheet, with resistance in a travelling direction thereof;

a turn section for turning the mounting sheet of said label continuum travelling from said label loading section to facilitate peeling of a label from the mounting sheet caused by stiffness of the label itself;

a winding section including a motor for pulling a turned mounting sheet as a driving source;

a label sticking section including a rotator, located at a side of a printed face of the label peeled from the mounting sheet;

label detecting means for ascertaining whether the label peeled from the mounting sheet is present;

mounting sheet slack detecting means for detecting a continual slack of the mounting sheet travelling in accordance with a transfer of the label until the label is completely removed from the mounting sheet when a peeled part of the label is pressed against an article to be stuck by said label sticking section and either the label or the article is moved to stick the label on the article or when the label is pulled out manually;

a control circuit for driving a motor to pull the mounting sheet by said winding section when said mounting sheet slack detecting means generates a mounting sheet slack detecting output and even when said label detecting means generates a label absence detecting output; and a timer circuit which, when said label detecting means is turned to a state of a label presence detecting output, causes drive of the motor to be continued for a predetermined time, which time is adjustable.

2. A label dispenser according to claim 1, wherein said turn section is placed so that said turn section is held at one end of a turn section supporting member and is provided with a bias force to be displaceable as a whole, and when the mounting sheet is slack, the turn section is displaced so as to generate a slack signal for said mounting sheet slack detecting means.

3. A label dispenser according to claim 2, wherein a temporary label receiver for supporting the label removed from the mounting sheet by turning the mounting sheet is interposed between said turn section and said label sticking section, and when said turn section is displaced, said turn section moved toward said temporary label receiver is fastened and an output of said mounting sheet slack detecting means is fixed in a state of an anti-slack detecting output.

* * * * *